July 27, 1943.  O. H. MILLER  2,325,532
BOAT OPERATED BY MOTIVE VEHICLES
Filed Dec. 12, 1941   3 Sheets-Sheet 3
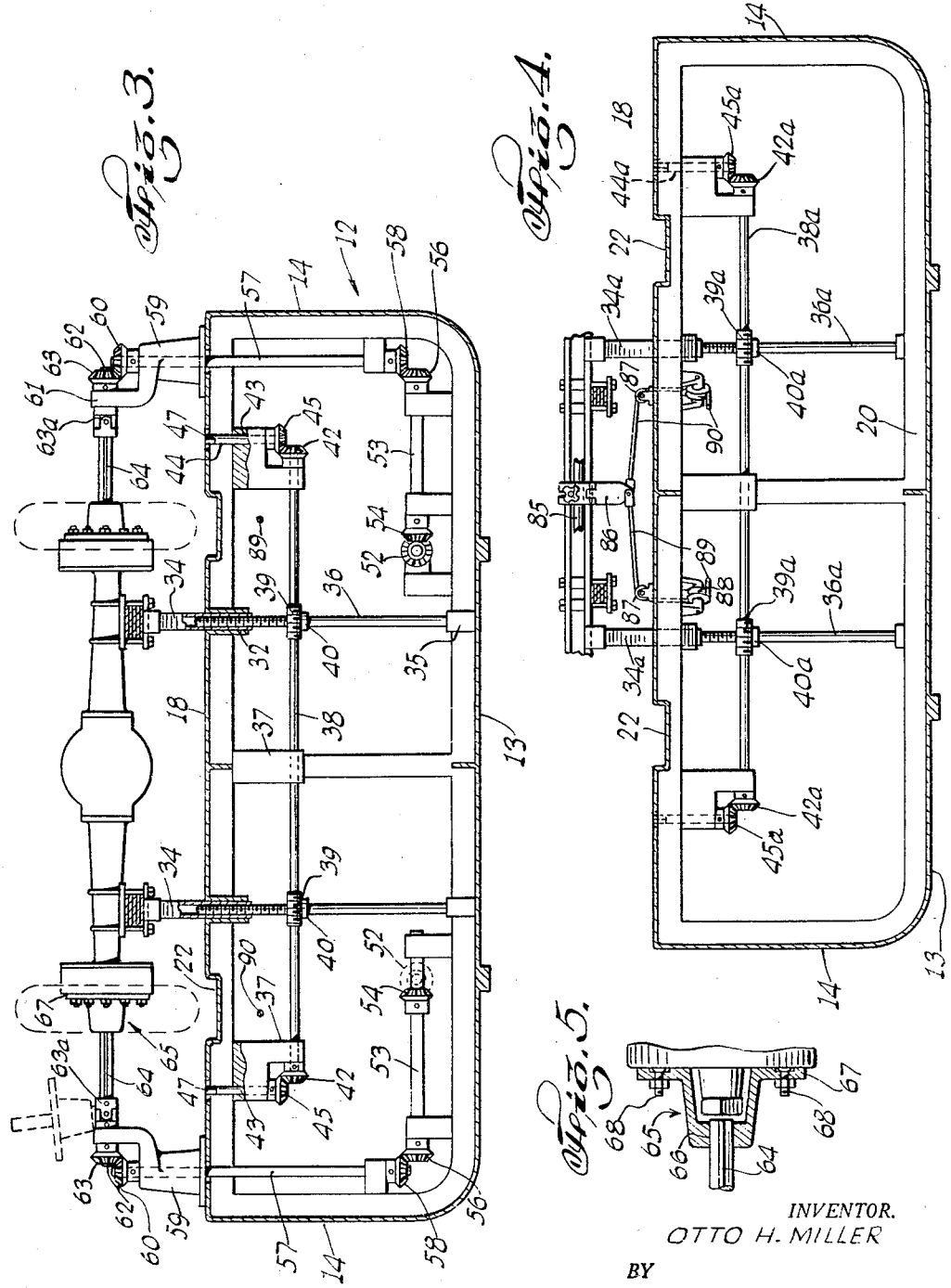
INVENTOR.
OTTO H. MILLER
BY
Carl Miller
ATTORNEY Patented July 27, 1943

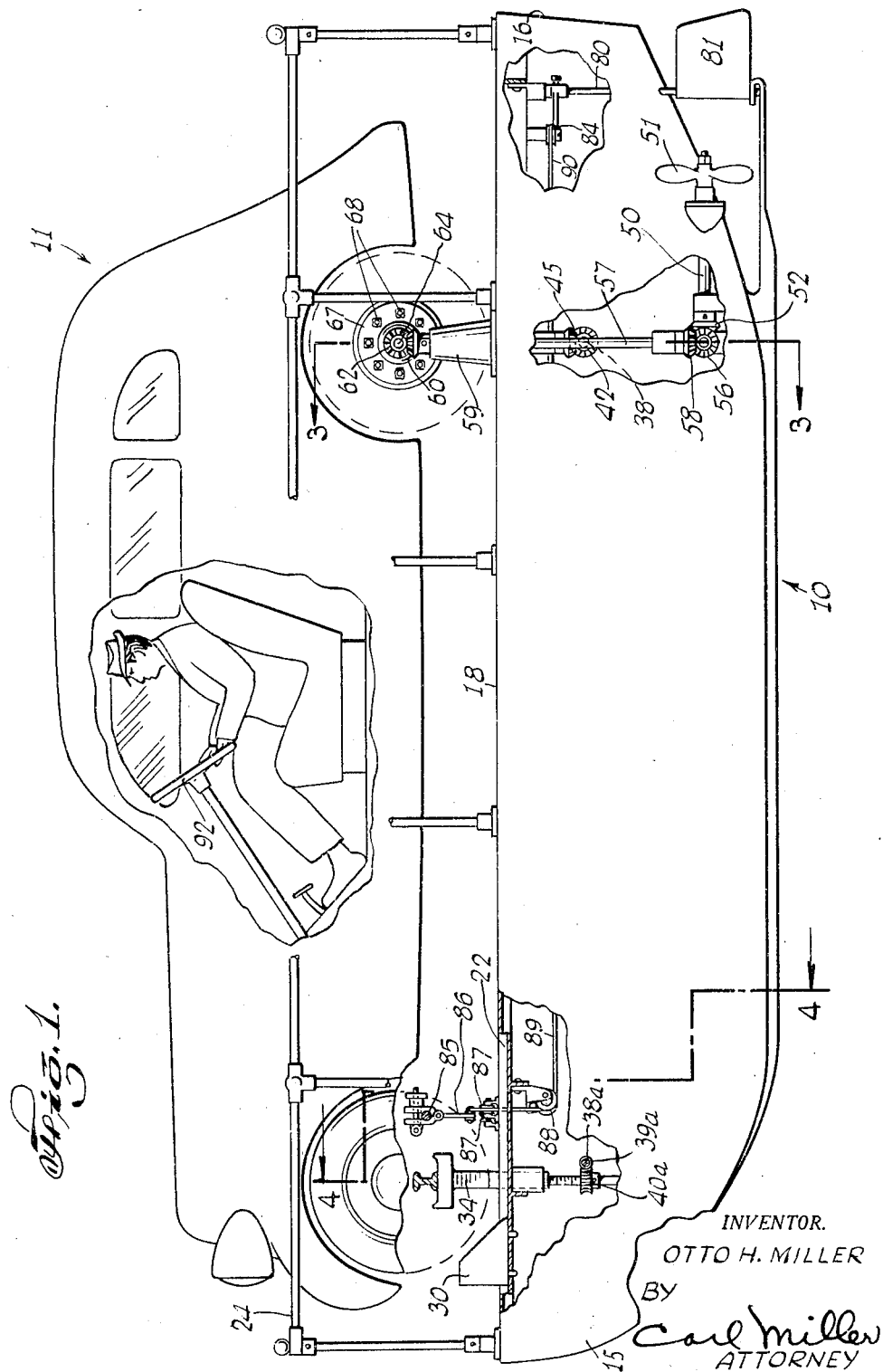

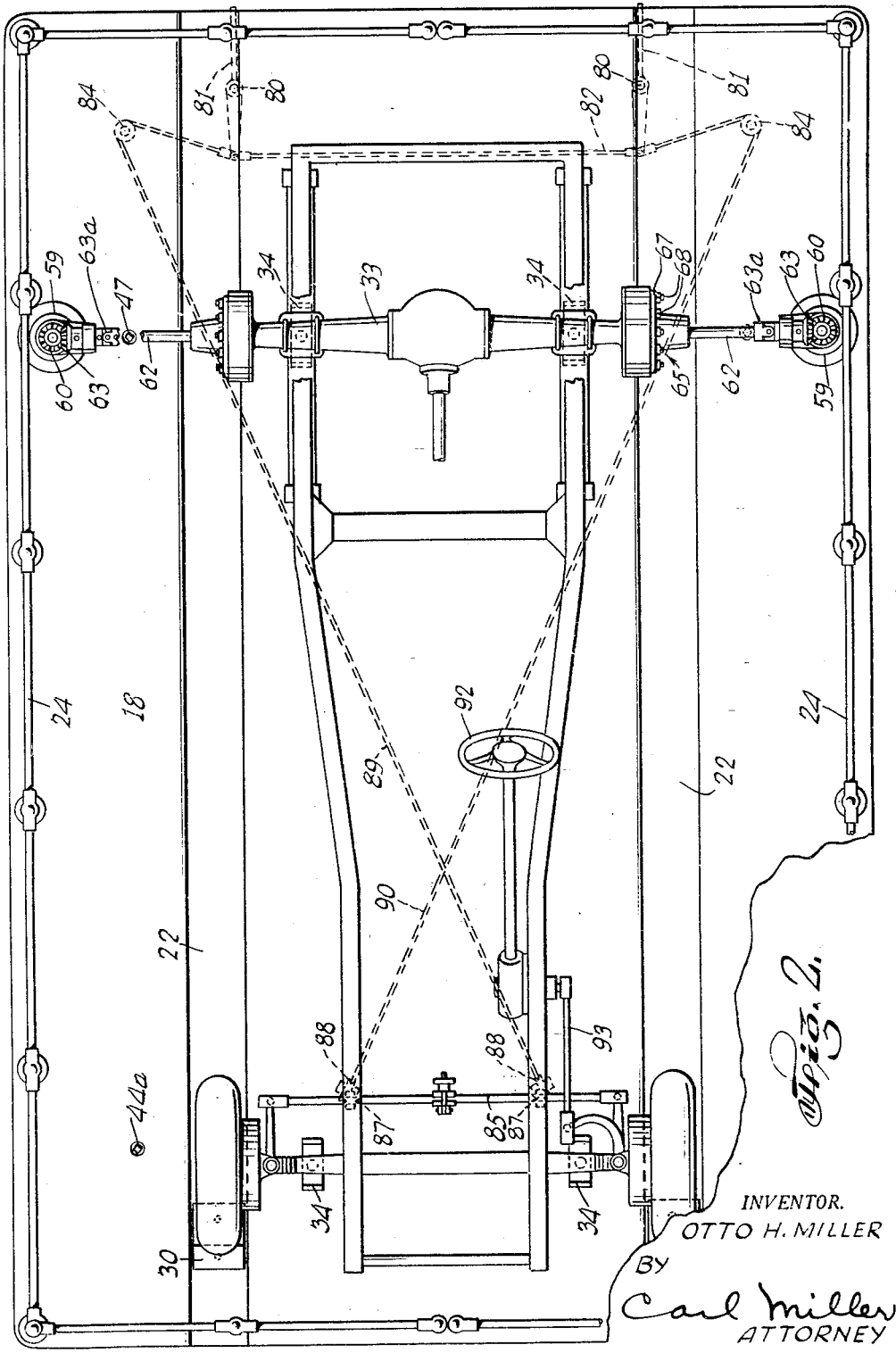

2,325,532

UNITED STATES PATENT OFFICE 2,325,532

BOAT OPERATED BY MOTIVE VEHICLES

Otto H. Miller, Union City, N. J.

Application December 12, 1941, Serial No. 422,655

3 Claims. (Cl. 115—0.5)

This invention relates to boats operated by motive vehicles.

An object of this invention is to provide a boat in the form of a float onto which an automobile or other motive vehicle may be run, means being provided to connect the vehicle to the boat and for propelling the boat by power generated in the vehicle motor.

In accordance with the present invention, an automobile or other motive vehicle may be run onto the float, the rear wheels of the vehicle removed, and the vehicle jacked up. Connectors are then attached to the rear axle of the vehicle and to parts on the boat for operating propellers on the boat, so that the propellers are rotated through power generated in the motor of the vehicle, and under the control of the operator sitting in the usual operator's seat in the vehicle.

Yet a further object of this invention is to provide means connectible to the front axle of the vehicle, whereby the float may be steered by the steering wheel of the vehicle.

Yet another object of this invention is to provide a durable boat operated by a vehicle motor, which shall be relatively inexpensive to manufacture, easy to manipulate, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a side elevational view of a boat with a vehicle mounted thereon, and embodying the invention;

Fig. 2 is a top plan view of the vehicle frame on the float or boat;

Fig. 3 is a cross-sectional view taken on line 3—3 of Fig. 1;

Fig. 4 is a cross-sectional view taken on line 4—4 of Fig. 1; and

Fig. 5 is a partial elevational view of the coupling member for the rear axle.

Referring now in detail to the drawings 10 designates a body or float adapted to be operated by the motor of an automobile or other motive vehicle 11. The boat 10 is in the form of a float or tank 12 comprising a flat bottom wall 13, side walls 14, a front wall 15 and a rear wall 16. The bottom wall may be curved upwardly towards the front and also curved upwardly toward the rear. The float also comprises a top wall 18, and is preferably air tight.

The tank or float may be made of sheet metal reinforced on the inside by reinforcing flanges 20 of any suitable type.

The top wall 18 may be provided with a pair of longitudinally depressed portions 22 serving as a runway for the vehicle to guide the vehicle onto the float. Any suitable railings 24 may be provided on top of the float.

The vehicle 11 is run forwardly onto the float until it contacts stops 30 at the front of the float. The automobile is then in position for connection to parts of the boat, as will appear hereinafter.

Means is provided to jack up the vehicle so that the rear wheels may be removed. To this end, the top wall 18 of the tank is formed with a pair of vertical sleeves 32 located beneath the rear axle 33 of the vehicle. Slidably and non-rotatably mounted within the openings 32 are internally screw threaded jack members 34 adapted to engage beneath the rear axles. Rotatably mounted within the bearings 35, located in bottom wall of the tank, and directly beneath the sleeves 32, are vertical screw members 36, the upper ends whereof have screw threaded engagement within the jack members 34. Thus, rotation of the screw members 36 will cause the jacks 34 to rise for lifting up the rear end of the car.

Mounted on suitable bearings 37 within the tank, is a horizontal shaft 38 carrying worms 39 meshing with worm wheels 40 on the screws 36. At the ends of shaft 38 are beveled gears 42. Rotatably mounted in bearings 43 within the tank are vertical shafts 44 carrying at their lower ends beveled gears 45 meshing with the beveled gears 42.

The upper ends 47 of shafts 44 are polygonal, and the top wall 18 recessed so that a wrench may be applied to said polygonal heads for rotating the shafts 44. Thus, by rotating either one of the shafts 44, both jacks 34 will rise or fall depending upon the direction of rotation. The front axle of the vehicle may be lifted likewise by similar jacks 34a located beneath the front axle and slidable in sleeves in the top wall 18 receiving the screw threads of vertical shafts 36a journalled within the tank.

The screw shafts 36a likewise carry worm wheels 40a meshing with worms 39a on a cross shaft 38a carrying beveled gears 42a. The bevels 42a likewise mesh with beveled gears 45a on vertical shafts 44a, having square heads at the upper ends thereof.

It will now be understood that the car may be jacked up by using the usual wrench which is carried as equipment by the vehicle. In other words, the same wrench which is used to remove the wheels of the car may be used for jacking up the car on the float. After the car is jacked up, the rear wheels may be removed in the usual way.

Means is provided for propelling the float by the motor of the vehicle. To this end, the float is provided with a pair of horizontal longitudinally extending propeller shafts 50 carrying propellers 51 located at the rear of the float. At the front ends of shaft 50 are beveled gears 52. Journalled within the tank are a pair of horizontal aligned transverse shafts 53 carrying beveled gears 54 meshing with the beveled gears 52. At the outer ends of shaft 53 are beveled gears 56. Journalled within the tank are vertical shafts 57 carrying beveled gears 58 at their lower ends meshing with the beveled gears 56.

On top of the tank are brackets 59 through which the upper ends of the vertical shaft 57 extend. At the upper end of shafts 57 are beveled gears 60. The brackets 59 carry offset arms 61 in which are journalled stud shafts 62 carrying beveled gears 63 meshing with the beveled gears 60. Connected to shaft 62 is a universal connection 63a from which there extends a short shaft 64 of non-circular cross-section.

Slidably mounted on each shaft 64 is a recessed disc 65. The recessed disc 65 has a central non-circular opening 66 slidably receiving the shaft 64. The recessed disc 65 is formed with an annular flange 67 adapted to contact the drum on the rear axles of the vehicle. The disc 65 may be attached to the drum by means of the stud screws 68 by which the wheels are usually attached to the drum.

It will now be understood that when the motor vehicle is operated, the power will be transmitted through the differential to the drums, discs 65, shaft 64, vertical shafts 57, horizontal shaft 53 and propeller shaft 50.

It will be noted that when the disc 65 is detached from the drum, it may be slidably moved on shaft 64, and said shaft may then be swung upwardly out of the way, to the dotted line position shown in Fig. 3 of the drawings.

It will now be understood that the operator sitting in the usual operator's seat in the vehicle, may control the motor of the vehicle for propelling the boat.

Means is provided to steer the boat by turning the usual steering wheel of the vehicle. To this end, there is mounted at the rear of the boat, a pair of substantially parallel, vertical rods 80 carrying rudders 81, at their lower ends, located outside of the boat. Connected to each rod 80 is an arm 81. Arms 81 are interconnected by a connecting rod 82. Located within the tank are pulleys 84 disposed on opposite sides of the arms 81, for the purpose hereinafter appearing.

Fixed to tie rod 85 of the steering gear, is a bracket 86. Mounted on wall 18, below the front axle, are pulleys 87, and mounted within the tank, below the top wall 18, are pulleys 88. Attached to bracket 86 is a cable 89 passing over one of the pulleys 87, then down through an opening in the top wall 18 of the tank, around one of the pulleys 88, and then diagonally to the opposite tank, and around one of the pulleys 84, said cable then being connected to one of the arms 81.

A second cable 90 is likewise connected to the bracket 86 and passes around the other pulley 87, down through an opening in the top wall of the tank, around the other pulley 88, and then diagonally across the tank and around the other pulley 84, said cable being connected to the other arm 81.

It will now be understood that as the steering wheel 92 is rotated, the motion is transmitted through the usual steering wheel shaft to the drag link 93, and to the tie rod 85. When the tie rod 85 is shifted in one direction, the rudders will be oscillated together in one direction, and when the tie rod is shifted in an opposite direction, the rudders are likewise turned in an opposite direction. The boat may thus be steered by the operator sitting in the operator's seat in the vehicle.

It will be understood that all openings in the walls of the tank are provided with leakproof bushings or packing glands.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. In combination with a boat, a motor vehicle on the boat, said vehicle having rear axles, means on the boat to jack up the vehicle on the boat, the rear wheels of the vehicle being removed, propelling means on the boat, and means to connect the propelling means to said rear axles of the vehicle.

2. In combination with a boat, a motor vehicle on the boat, said vehicle having front wheels, rear axles, and a steering gear, including a tie rod connected to the front wheels, means on the boat to jack up the vehicle on the boat, the rear wheels of the vehicle being removed, propelling means on the boat, means to connect the propelling means to the rear axles of the vehicle, a rudder on the boat, and means to connect the rudder to the tie rod of the steering gear of the vehicle.

3. In combination, a tank, a vehicle thereon having front and rear ends and axles provided with brake drums, a runway on the tank to guide a vehicle run onto the tank, stop means on the tank to stop the vehicle in a predetermined position on the tank, and means on the tank to jack up the front and rear ends of the vehicle after the vehicle has been run onto the tank and stopped by said stop means, a pair of propeller shafts on the tank, a pair of propellers on said propeller shafts, a pair of vertical shafts rotatably mounted on the tank and operatively connected to said propeller shafts, members attached to the drums on the rear axles of the vehicle, and means to connect said members to said vertical shafts.

OTTO H. MILLER.